United States Patent
Petersen

(10) Patent No.: US 8,537,842 B2
(45) Date of Patent: Sep. 17, 2013

(54) NETWORK DEVICE WITH VIRTUAL SWITCH FABRIC

(75) Inventor: Brian A. Petersen, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 585 days.

(21) Appl. No.: 12/649,793

(22) Filed: Dec. 30, 2009

(65) Prior Publication Data

US 2011/0158245 A1 Jun. 30, 2011

(51) Int. Cl.
*H04L 12/28* (2006.01)

(52) U.S. Cl.
USPC .......................................... 370/401; 709/232

(58) Field of Classification Search
USPC .................... 370/401, 392; 709/232
See application file for complete search history.

(56) References Cited

U.S. PATENT DOCUMENTS

| | | | |
|---|---|---|---|
| 7,860,097 B1* | 12/2010 | Lovett et al. | 370/392 |
| 2006/0088040 A1* | 4/2006 | Kramer et al. | 370/400 |
| 2006/0203725 A1* | 9/2006 | Paul et al. | 370/229 |
| 2010/0034215 A1* | 2/2010 | Patel et al. | 370/463 |
| 2011/0142441 A1* | 6/2011 | Wellbrock et al. | 398/25 |

* cited by examiner

*Primary Examiner* — Wei Zhao
(74) *Attorney, Agent, or Firm* — Brake Hughes Bellermann LLP

(57) ABSTRACT

Methods and apparatus for processing packet data are disclosed. An example apparatus includes a plurality of network interfaces configured to send and receive packet data. The example apparatus further includes a switching module coupled with the plurality of network interfaces, the switching module being configured to communicate the packet data to and from the plurality of network interfaces. The example apparatus still further includes a fabric interface controller coupled with the switching module. The example apparatus also includes a virtual fabric interface controller coupled with the fabric interface controller.

21 Claims, 3 Drawing Sheets

NETWORK DEVICE WITH VIRTUAL SWITCH FABRIC

TECHNICAL FIELD

This description relates to processing of packets in data networks.

BACKGROUND

Data communication applications and the use of data networks continue to grow at a rapid pace. Often times it is desirable to communicate (switch) data from one segment of a data network to another segment of the data network. Often it is desirable to have such data communication occur with as little latency as possible. Different approaches may be used to accomplish such switching of data traffic.

One current approach is the use of mesh networks. In a mesh network, each element (node) of the network is directly connected to every other node in the network. Such an approach achieves low latency for communicating data from one node to another. However, implementing such a configuration in networks with a large number of nodes may be prohibitive due to the number of data connections each network node must support. Because each node in a mesh network is directly connected to every other node in the network, each node in the network must support N-1 network connections/interfaces, where N is the number of nodes in the network. In a simple example, to implement a mesh network for 10 nodes, each node must support 9 network connections. Such an approach is costly and complicated to implement.

Another current approach for communicating data from one portion of a network to another portion of the network is the use of ring networks. A ring network, as the term implies, is implemented by connecting nodes of a network in a circular fashion. Data may be moved from one segment of an associated network to another segment of the network by transmitting the data to one of the nodes of the ring. The data may then be communicated, via the ring connections, to another node of the ring and then communicated to its desired destination.

While ring networks do not require the large number of connections that are used in a mesh network, such approaches also have drawbacks. First, ring networks may experience data congestion when used in networks that carry a high volume of data traffic as there is typically only a single network connection between elements of the ring. Such congestion may lead to data traffic blocking problems, as well as packet loss due to packets being dropped as a result of data congestion. Also, the ring configuration, even in the absence of congestion or blocking problems, may increase the latency of communicating data from a source to a destination by significantly increasing the number of hops the data must take between its source and destination, such as compared to a mesh network.

SUMMARY

A method and/or apparatus for network switching using a virtual switch fabric, substantially as shown in and/or described in connection with at least one of the figures, as set forth more completely in the claims.

DETAILED DESCRIPTION

Figure 1:
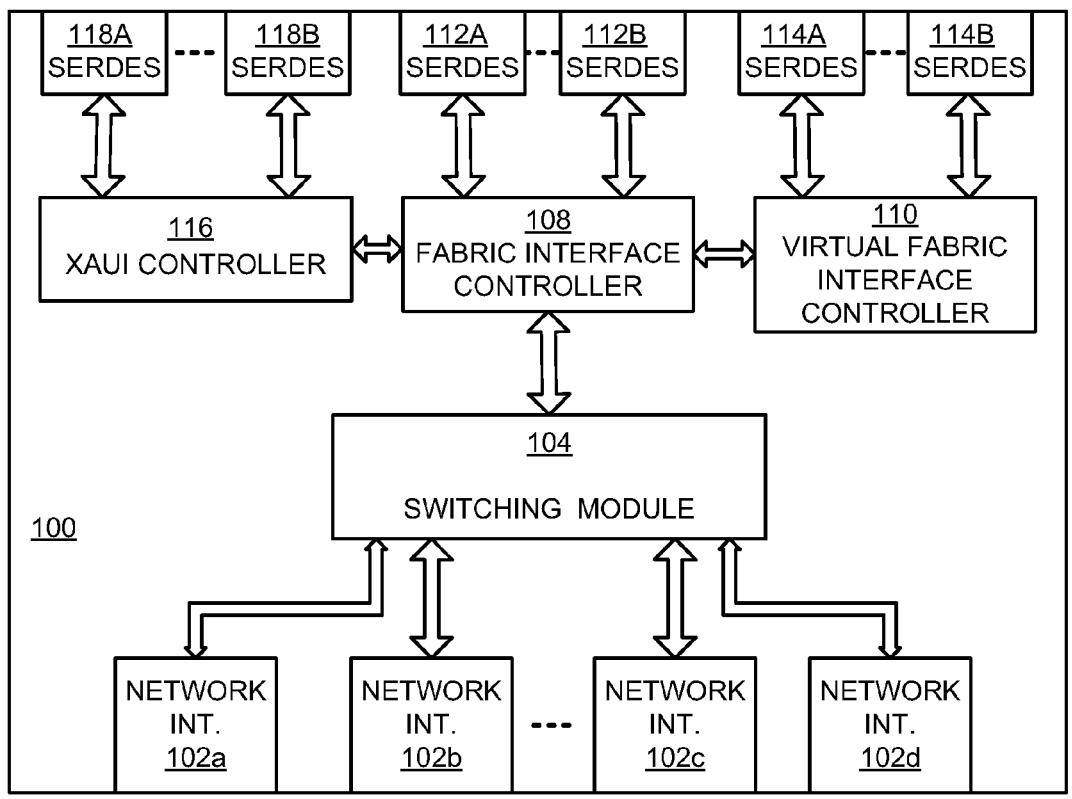
FIG. 1 is a block diagram of a network device in accordance with an example embodiment.

FIG. 1 is a block diagram of a network device 100 in accordance with an example embodiment. The network device 100 includes a plurality of network interfaces 102a, 102b, 102c and 102d. While the network device 100 is illustrated with four network interfaces 102a-d, in other embodiments, the network device 100 may include fewer or additional network interfaces 102. The network interfaces 102a-102d of the network device 100 may be implemented using a number of techniques. For instance, the network interfaces 102a-102d may be implemented as Ethernet interfaces using wired connections (e.g., such as using category (CAT) 5 or 6 cables). In other embodiments, the network interfaces 102a-102d may be implemented using wireless connections (e.g., such as wireless connections implemented in accordance with one or more of the 802.11 standards). In still other embodiments, other techniques may be used to implement the network interfaces 102a-102d.

Figure 2:
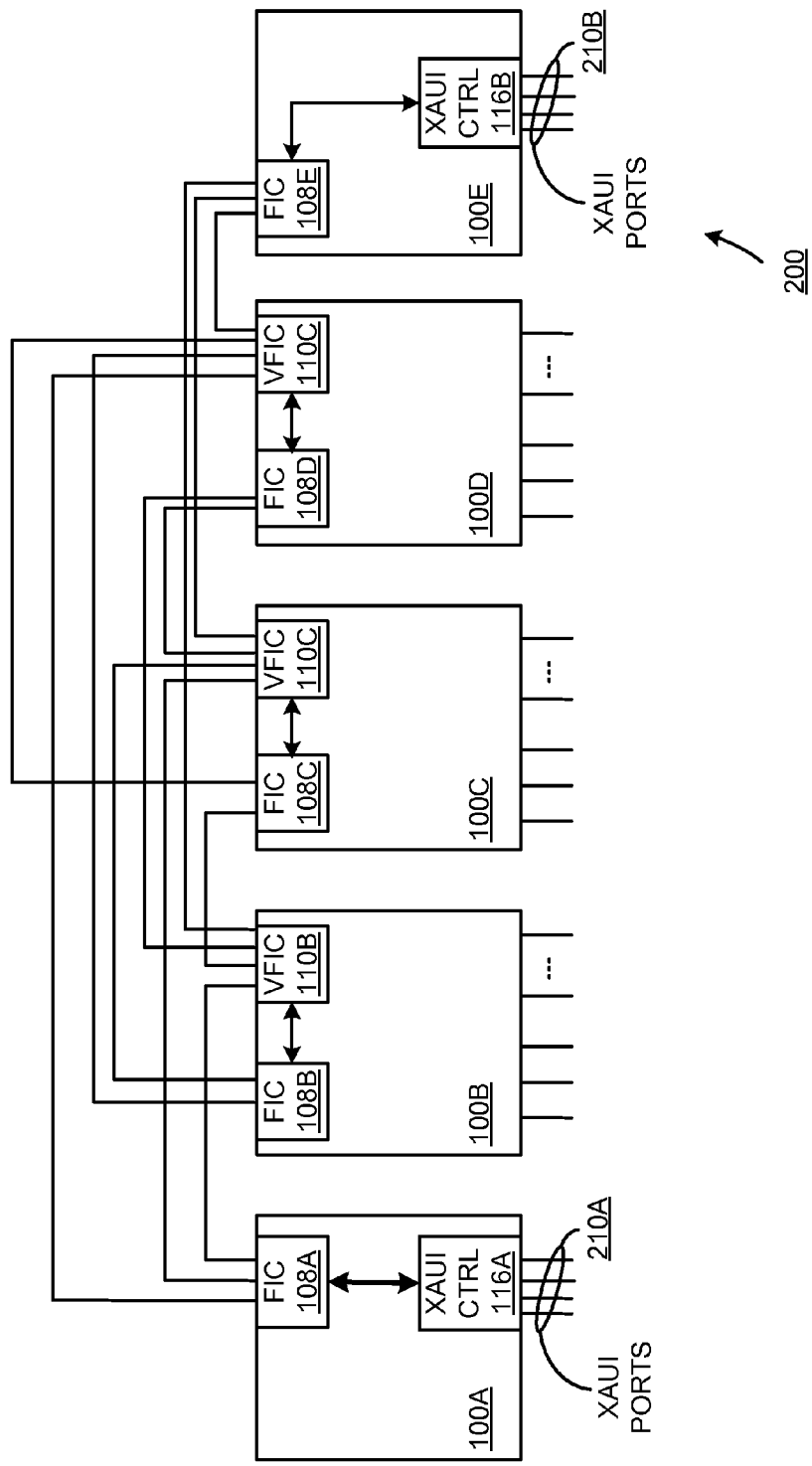
FIG. 2 is a block diagram of a network switch in accordance with an example embodiment.

In the network device 100, the network interfaces 102a-102d may send and receive packet data to/from a data network. For instance, the network device 100 may be used to implement a packet switch. Depending on the particular embodiment, the network device 100 operates as a single network device or may be combined with one or more other network devices 100 to implement a data switch with a larger number of network interfaces 102. In such approaches, the network device 100 (or a packet switch including the network device 100) may be configured to switch packet data between the network interfaces using the techniques described herein. For example, if the network device 100 includes 8 network interfaces 102, network switches with 16, 24 and 48 network interfaces (e.g., data ports) may be implemented using, respectively, two, three and six network devices 100 in combination, such as in like fashion as illustrated in FIG. 2 and discussed below.

As shown in FIG. 1, the network device 100 also includes a switching module 104 that is coupled with the plurality of network interfaces 102a-102d. In the network device 100, the switching module 104 may be configured to communicate packet data that is being processed by the network device 100 (or a network switch including the network device 100) to and from the plurality of network interfaces 102a-102d. In an example embodiment, the switching module 104 may include an ingress port, a memory management unit (MMU) and an egress port for use in implementing packet switching operations in the network device 100.

As is further shown in FIG. 1, the network device 100 also includes a fabric interface controller 108 and a virtual fabric interface controller 110. The fabric interface controller 108 and the virtual fabric interface controller 110 may be used to implement a switch fabric in a network switch that includes a plurality of network devices, such as a plurality of the network devices 100. Such approaches are discussed in further detail below. For instance, such techniques may be implemented in a network switch, such as the network switch 200 illustrated in FIG. 2 or in other network switch configurations.

In the network device 100, the fabric interface controller 108 may be operatively coupled with the switching module 104. In such an arrangement, the fabric interface controller 108 may be configured to send and receive packet data to/from the switching module 104 and may also be operatively coupled with the virtual fabric interface controller 110, such that packet data (e.g., in the form of packet segments) may be communicated between the fabric interface controller 108 and the virtual fabric interface controller 110.

In the network device 100, the fabric interface controller 108 may be further configured to be operatively coupled (so as to communicate packet data) with virtual fabric interface controllers of one or more other network devices. Depending on the particular embodiment, the other network devices may be of the same or different configurations as the network device 100. For instance, the fabric interface controller 108 of the network device 100 may communicate with virtual fabric controllers 110 of other network devices 100 via the serializer/de-serializers (SERDES) 112A-112B. In such an arrangement, packet data may be received at the virtual fabric interface controllers 110 of other network devices 100 via SERDES 114A-114B, as shown in FIG. 1. Of course, other arrangements for communicating packet data (e.g., packet segments) between network devices of a network switch are possible, and such a switch is not limited to using a single type of network device.

In an example embodiment, the fabric interface controller 108 of the network device 100 may receive a data packet from the switching module 104. The fabric interface controller 108 may then segment the received data packet into a plurality of packet segments. After a given data packet is segmented, the fabric interface controller 108 may communicate the plurality of packet segments of the given data packet from the network device 100 to a second network device. In an example embodiment, the fabric interface controller 108 may communicate the plurality of packet segments to the second network device via the virtual fabric interface controller 110 (via at least one of the SERDES 114) and via a virtual fabric interface controller of a third network device (via at least one of the SERDES 112). The plurality of packet segments may also be communicated to the second network device via virtual fabric controllers of additional network devices.

In order to efficiently communicate packet data between network devices 100 of a network switch, it may be desirable to balance the transmission of packet data (e.g., packet segments) across the various links used to communicate packet data between the network devices. In a simple example, a data packet may be received at the fabric interface controller 108 from the switching module 104. The fabric interface controller 108 may then segment the packet into a plurality of packet segments. In a network switch that is implemented using three network devices, the plurality of packet segments may be transmitted from a first network device 100 to a second network device 100 in two portions of substantially the same amount of packet segments.

In this example, a first portion of the packet segments may be communicated from the fabric interface controller 108 of the first network device 100 to the virtual fabric interface controller 110 of the first network device 100 via an internal connection in the network device 100. The first network device 100 may then communicate the first portion of packet segments from its virtual fabric interface controller 110 to a fabric interface controller of the second network device (e.g., via the associated SERDES, as shown in FIG. 1). A second portion of the plurality of packet segments may be communicated from the fabric interface controller 108 of the first network device 100 to a virtual fabric interface controller of the third network device (e.g., via the associated SERDES). The third network device may then communicate the second portion of packet segments from its virtual fabric interface controller to the fabric interface controller of the third network device, using the corresponding SERDES, in like fashion as discussed above.

In larger packet switches, where additional network devices are used, data packets may be communicated in more than two portions of segments, depending on the particular configurations. For instance, in a network switch that includes six network devices, packets may be communicated in more than two portions of segments using techniques similar to those discussed above. In an example approach, a first portion of packet segments may be communicated from an originating (first) network device 100 to a receiving (second) network device 100 via the virtual fabric controller 110 of the first network device 100 and the fabric interface controller 108 of the second network device 100. Additional portions of packet segments may be communicated from the first network device 100 to the second network device 100 via the fabric interface controller 108 of the first network device 100 and virtual fabric controllers 110 of additional network devices 100 (e.g., third and fourth network devices). In each instance, the portions of packet segments may be communicated between the network devices of a packet switch using SERDES, such as those illustrated in FIG. 1.

In a situation where the network device 100 is receiving packet segments of a corresponding data packet being sent from a second network device (e.g., using the techniques described herein), the fabric interface controller 108 may reassemble the received packet segments into the corresponding data packet. The reassembled data packet may then be communicated from the fabric interface controller 108 to the switching module 104. The switching module 104 may then communicate the reassembled data packet to a network interface of the network interfaces 102a-102d that corresponds with a destination of the packet. The corresponding network interface 102 may then communicate the data packet on to its destination via an associated network link. For instance, the packet segments of a packet that is to be reassembled by the network device 100 may be received at the fabric interface controller 108 from one or more respective virtual fabric interface controllers of one more other network devices as well as its own virtual fabric interface controller 110.

In arrangements such as those described above, a number of data traffic load balancing techniques may be used to distribute the portions of packet segments across the various links between network devices. For instance, round robin scheduling approaches may be used. In other embodiments, link accounting load balancing techniques, such as techniques using a transmission credit system may be used. In other embodiments, a number of other appropriate load balancing approaches may be used.

As discussed above, the network device 100 may include a plurality of SERDES that may be used to communicate packets data (e.g., in the form of packet segments) between the network device 100 and other network devices, such as in a packet switch. For purposes of illustration, a number of example arrangements for such SERDES in the network device 100 are described below. It will be appreciated that the various approaches described herein may also be applied to additional network devices and may also be used in appropriate combinations.

Also in the examples described below, the SERDES may be of a specific design to operate in one configuration or may be designed such that they may perform different functions depending on the particular configuration of a given embodiment. For instance, each SERDES in the network device 100 may be selectively configurable (e.g., using a configuration register or configuration bits) to operatively couple the fabric interface controller 108 with a virtual fabric interface controller of a second network device or operatively couple the virtual fabric interface controller 110 with a fabric interface controller of the second network device. The SERDES of the network device 110 may also be configurable to operate as part of a high-speed link, such as is discussed below. In one embodiment, each of the SERDES of the network device 110 may comprise a SERDES configured to support data rates of 3.3 gigabits per second (Gbps).

In a first example, the network device 100 is described as communicating packet segments to a second network device. In this example, the network device 100 includes a first SERDES (e.g., one of the SERDES 114A or 114B) that is coupled with the virtual fabric interface controller 110. In this situation, the first SERDES may be configured to communicate a first portion of packet segments associated with a packet being sent to the second network device to a fabric interface controller of the second network device.

Further in this example, the network device 100 also includes a second SERDES (e.g., one of the SERDES 112A or 112B) that is coupled with the fabric interface controller 108. The second SERDES, in this example, may configured to communicate a second portion of the packet segments for the packet being sent to the second network device via a virtual fabric interface controller of a third network device, where the virtual fabric controller of the third network device is configured to communicate the second portion of packet segments to the fabric interface controller of the second network device. In such an approach, additional SERDES may be used to send additional portions of packets segment to the second network device, such as via virtual fabric controllers of other network devices.

In a second example, the network device 100 is described as receiving packet segments from a second network device. In this example, the network device 100 includes a first SERDES (e.g., one of the SERDES 114A or 114B) that is coupled with the virtual fabric interface controller 110. In this situation, the first SERDES may be configured to receive a first portion of packet segments associated with a packet being sent from the second network device. In this example, the virtual fabric interface controller 110 may then communicate the first portion of packet segments to the fabric interface controller 108 of the network device 100 via an internal connection, as illustrated in FIG. 1.

Further in the second example, the network device 100 also includes a second SERDES (e.g., one of the SERDES 112A or 112B) that is coupled with the fabric interface controller 108. The second SERDES, in this example, may be configured to receive a second portion of the packet segments for the packet being sent from the second network device via a virtual fabric interface controller of a third network device. In this situation, the virtual fabric controller of the third network device may be configured to receive the second portion of packet segments from the fabric interface controller of the second network device. In such an approach, additional SERDES may be used to receive additional portions of packet segments from the second network device, such as via virtual fabric controllers of the other network devices.

In yet another example embodiment, the network device 100 may include a first SERDES (e.g., one of the SERDES 112A or 112B) that is coupled with the fabric interface controller 108, where the first SERDES is configured to communicate packet segments to, and receive packet segments from a virtual fabric interface controller of a second network device. In this example, the network device 100 may further include a second SERDES (e.g., one of the SERDES 114A or 114B) that is coupled with the virtual fabric interface controller 110, where the second SERDES is configured to send packet segments to, and receive packet segments from a fabric interface controller of the second network device. In this situation, the first and second SERDES may be configured to operate in a bi-directional manner so as to allow for communicating packet data (segments) in both directions.

As was discussed above, the network device 100 (e.g., using SERDES 118A-118B) may be configured to implement a high speed data communication port, such as a 10-Gigabit Attachment Unit Interface (XAUI). As shown in FIG. 1, the network device 100 includes a XAUI controller 116 that may be used to implement such a port. The XAUI controller 116 may be coupled with a plurality of SERDES 118A-118D to implement a XAUI port. For example, four 3.3 Gbps SERDES may be used to implement such a XAUI port. In similar fashion as discussed above with respect to the SERDES 112 and 114, the SERDES 118 may be specifically configured (or may be selectively configurable) to implement a data traffic lane of a XAUI. For instance, the network device 100 may include a plurality of SERDES that are each selectively configurable to operate in any of the manners described herein and also configured to be selectively coupled with the various elements of the network device 100 (e.g., the fabric interface controller 108, the virtual fabric interface controller 110, or the XAUI controller 116).

FIG. 2 is a block diagram illustrating an example embodiment of a network (packet) switch 200. The network switch includes five network devices 100A-100E, which may each be implemented using the network device 100 shown in FIG. 1. Because techniques for communicating packet data (segments) between network devices 100 were discussed above, for the sake of brevity, those discussions will not be repeated here. The following discussion, instead, describes the interconnections between the network devices 100A-100E in the switch 200.

For purposes of the following discussion, the elements of the network devices 100A-100E are referenced with like reference numbers as the network device 100 in combination with the same letter as its corresponding network device in the switch 200. For instance, in the network device 100A, the fabric interface controller is referenced as 108A. Also in FIG. 2, the SERDES of the network devices 100A-100E are not shown. However, it will be appreciated that each of the network devices 100A-100E may include SERDES, such as those described above, for communicating packet data in the switch 200.

In the switch 200, the network devices 100A and 100E are used to implement XAUI ports 210A and 210B. In such an arrangement, the virtual fabric controllers of the network devices 100A and 100E are not used and, therefore, are not shown in FIG. 2. The fabric interface controllers 108A and 108E, as illustrated in FIG. 2, are coupled with the virtual fabric interface controllers 110B, 110C and 110D (e.g., via SERDES) of the network devices 110B-110D. If 3.3 Gbps SERDES are implemented in the network devices 100, such an arrangement provides the 10 Gbps bandwidth for each of the XAUI ports 210A and 210B. Such an arrangement also allows the network devices 110A and 110E to receive packet data from each of the network devices 110B, 110C and 110D.

As also shown in FIG. 2, each of the fabric interface controllers 108B, 108C and 108D of the network devices 100B, 100C and 100D is coupled with each of the virtual fabric interface controllers 110B, 110C and 110D of the other network devices 100B, 100C and 100D. As was discussed above, the fabric interface controller of each of the network devices 100B-100D is internally coupled with its respective virtual fabric interface controller. Using such an arrangement, and the techniques described above, the network switch 200 may be used to switch packet data between network interfaces of the network devices 100B, 100C and 100D, as well as implement the XAUI ports 210A and 210B.

Other arrangements are also possible. For instance, the virtual fabric controllers 110 of one or two of the network devices 100B, 100C and 100D may not be used. By reducing the number of virtual fabric interface controllers 110 that are used in the switch 200, the number of connections between the network devices 100B, 100C and 100D may be reduced, which may simplify the design of the switch 200, as well as decrease costs. However, reducing the number of virtual fabric interfaces used may also result in increased data traffic congestion because the virtual fabric controller(s) of the other device would handle an increased amount of data traffic in a network switch 200 that has a constant amount of data traffic. Such increased data traffic loads may increase transmission times and/or result in data packets being dropped if one or more links in the network switch becomes oversubscribed (e.g., has more data to transmit than available bandwidth). Therefore, the particular arrangement of network devices 100 in the switch 200 depends on the particular embodiment and network parameters in which such a switch is to be implemented.

Network switches, such as the network switch 200, may be beneficial as they provide for high-bandwidth/low-latency data communication, such as in a mesh network, but with reduced interconnection complexity as compared to a mesh network (e.g., comparable with a ring network). Such configurations may also be advantageous as compared with ring networks as they allow for full-bandwidth, non-blocking data communication, which is not practical in a ring network configuration.

Figure 3:
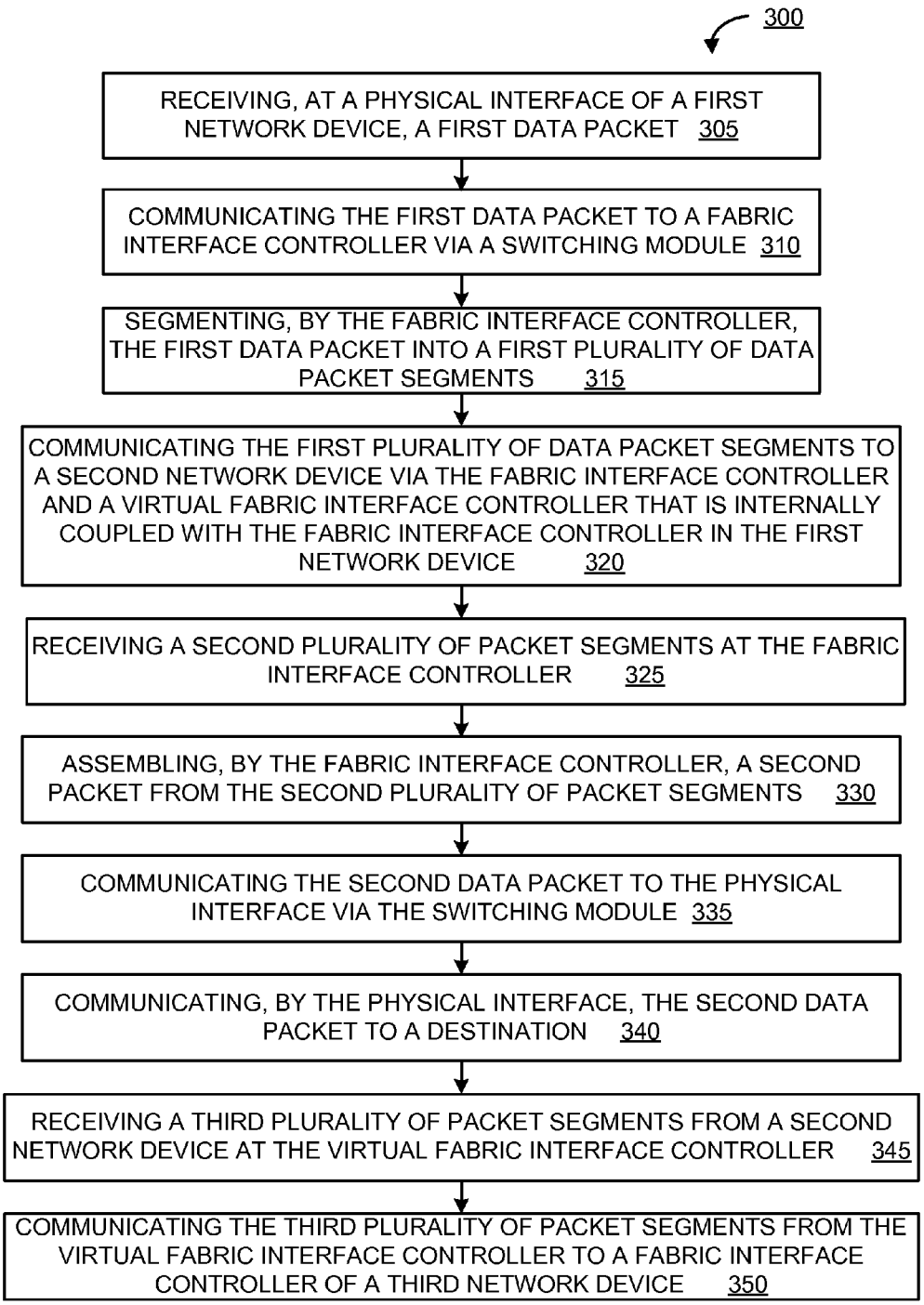
FIG. 3 is a block diagram of a method for switching packet data in accordance with an example embodiment.

FIG. 3 is flowchart illustrating an example embodiment of a method 300 for switching/communicating packet data. The method 300 may be implemented, for example, in the network switch 200, or maybe implemented in other network switch configurations, such as a router, for example. The techniques for transmitting and receiving packet data (e.g., packet segments) discussed above may be used to implement the operations of the method 300. Thus, for the sake of clarity and brevity, those techniques are not described again in detail with respect to FIG. 3.

The method 300 may include, at block 305, receiving, at a network interface of a first network device, a first data packet. At block 310, the method 300 may further include communicating the first data packet to a fabric interface controller via a switching module. At block 315, the method 300 may include segmenting, by the fabric interface controller, the first data packet into a first plurality of data packet segments. At block 320, the method 300 may further include communicating the first plurality of data packet segments to a second network device via the fabric interface controller and a virtual fabric interface controller of the first network device that is internally coupled with the fabric interface controller in the first network device.

The method 300 may also include, at block 325, receiving a second plurality of packet segments at the fabric interface controller and, at block 330, assembling, by the fabric interface controller, a second packet from the second plurality of packet segments. At block 335, the method 300 may include communicating the second data packet to the network interface via the switching module, and, at block 340, communicating, by the network interface, the second data packet to a destination.

At block 345, the method 300 may still further include receiving a third plurality of packet segments from a second network device at the virtual fabric interface controller of the first network device. The method 300 may also include, at block 350, communicating the third plurality of packet segments from the virtual fabric interface controller to a fabric interface controller of a third network device.

The operations of the method 300 may be performed in any appropriate order or arrangement. In certain situations, some operations of the method 300 may be omitted, while in other situations, additional operations may be added. The operations of the method 300 may also be performed in like fashion using additional network devices to communicate packet segments between additional network devices included in a packet switch, such as the packet switch 200, or in other packet processing devices, such as a network router, for example. In certain embodiments, the packets that are received at the network interfaces and sent out from the network interfaces may be packets that are received and sent via data lanes of a high-speed data port, such as a XAUI port, as was discussed above.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD)

monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A network device comprising:
    a data switch;
    a fabric interface controller operably coupled with the data switch; and
    a virtual fabric interface controller operably coupled with the fabric interface controller, the virtual fabric interface controller being configured to:
        receive a first portion of a first plurality of data packet segments; and
        communicate the first portion of the first plurality of data packet segments to the fabric interface controller, and
    the fabric interface controller being configured to:
        receive a second portion of the first plurality of data packet segments;
        assemble the first portion of the first plurality of data packet segments and the second portion of the first plurality of data packet segments to generate a first data packet; and
        communicate the first data packet to the data switch.

2. The network device of claim 1, wherein:
    the fabric interface controller is configured to be operatively coupled with respective virtual fabric interface controllers of one or more other network devices; and
    the virtual fabric interface controller is configured to be operatively coupled with respective fabric interface controllers of the one or more other network devices.

3. The network device of claim 1, wherein the fabric interface controller is further configured to:
    receive a second data packet from the data switch;
    segment the second data packet into a second plurality of packet segments;
    communicate a first portion of the second plurality of packet segments to a second network device; and
    communicate a second portion of the second plurality of packet segments to the second network device via the virtual fabric interface controller.

4. The network device of claim 3, further comprising:
    a first serializer/de-serializer (SERDES) coupled with the virtual fabric interface controller, the first SERDES being configured to communicate the first portion of the second plurality of packet segments to the second network device; and
    a second SERDES coupled with the fabric interface controller, the second SERDES being configured to communicate the second portion of the second plurality of packet segments to the second network device via a virtual fabric interface controller of a third network device.

5. The network device of claim 1, wherein:
    the virtual fabric interface controller is configured to receive the first portion of the first plurality of packet segments from a fabric interface controller of a second network device; and
    the fabric interface controller is configured to receive the second portion of the first plurality of packet segments from the second network device via a virtual fabric interface controller of a third network device.

6. The network device of claim 5, further comprising:
    a first serializer/de-serializer (SERDES) coupled with the virtual fabric interface controller, the first SERDES being configured to receive the first portion of the first plurality of packet segments from the fabric interface controller of the second network device; and
    a second SERDES coupled with the fabric interface controller, the second SERDES being configured to receive the second portion of the first plurality of packet segments from the virtual fabric interface controller of the third network device.

7. The network device of claim 1, further comprising:
    a first serializer/de-serializer (SERDES) coupled with the fabric interface controller, the first SERDES being configured to communicate packet segments to, and receive packet segments from a virtual fabric interface controller of a second network device; and
    a second SERDES coupled with the virtual fabric interface controller, the second SERDES being configured to send packet segments to, and receive packet segments from a fabric interface controller of the second network device.

8. The network device of claim 1, further comprising a plurality of serializer/de-serializers (SERDES), wherein the plurality of SERDES are each selectively configurable to:
    operatively couple the fabric interface controller with a virtual fabric interface controller of a second network device; or
    operatively couple the virtual fabric interface controller with a fabric interface controller of the second network device.

9. The network device of claim 1, further comprising:
    a 10-Gigabit Attachment Unit Interface (XAUI) controller; and
    a plurality of serializer/de-serializers (SERDES) coupled with the XAUI controller, each of the plurality of SERDES being selectively configurable to implement a data traffic lane of a XAUI.

10. The network device of claim 9, wherein each of the plurality of SERDES is further selectively configurable to:
    operatively couple the fabric interface controller with a virtual fabric interface controller of a second network device; or
    operatively couple the virtual fabric interface controller with a fabric interface controller of the second network device.

11. The network device of claim 1, further comprising a plurality of network interfaces operably coupled with the data switch, the plurality of network interfaces being configured to send and receive packet data.

12. The network device of claim 1, wherein the virtual fabric interface controller is internally coupled with the fabric interface controller.

13. A method of switching packet data, the method comprising:
receiving, at a network interface of a first network device, a first data packet;
communicating the first data packet to a fabric interface controller via a data switch;
segmenting, by the fabric interface controller, the first data packet into a first plurality of data packet segments;
communicating a first portion of the first plurality of data packet segments to a second network device via the fabric interface controller; and
communicating a second portion of the first plurality of data packet segments to the second network device via a virtual fabric interface controller that is internally coupled with the fabric interface controller in the first network device.

14. The method of claim 13, wherein:
communicating the first portion of the first plurality of data packet segments from the fabric interface controller to the second network device includes communicating the first portion of the first plurality of data packet segments via a virtual fabric interface controller of a third network device; and
communicating the second portion of the first plurality of data packet segments to the second network device includes communicating the second portion of the first plurality of data packet segments from the virtual fabric interface controller to a fabric interface controller of the second network device.

15. The method of claim 14, further comprising:
receiving a first portion of a second plurality of data packet segments at the fabric interface controller;
receiving a second portion of the second plurality of data packet segments at the virtual fabric interface controller;
communicating the second portion of the second plurality of data packet segments from the virtual fabric interface controller to the fabric interface controller;
assembling, by the fabric interface controller, a second data packet from the first portion of the second plurality of data packet segments and the second portion of the second plurality of data packet segments;
communicating the second data packet to the network interface via the data switch; and
communicating, by the network interface, the second data packet to a destination.

16. The method of claim 13, further comprising:
receiving a second plurality of data packet segments from a third network device at the virtual fabric interface controller; and
communicating the second plurality of data packet segments from the virtual fabric interface controller to a fabric interface controller of a fourth network device.

17. The method of claim 15, wherein:
receiving the first portion of the second plurality of data packet segments at the fabric interface controller includes receiving the first portion of the second plurality of data packet segments from a virtual fabric interface controller of a third network device; and
receiving the second portion of the second plurality of data packet segments at the virtual fabric interface controller includes receiving the second portion of the second plurality of data packet segments from a virtual switch fabric interface controller of a fourth network device.

18. The method of claim 17, wherein the second network device and the fourth network device are a same network device.

19. The method of claim 16, wherein the second network device and the third network device are a same network device.

20. A network device comprising:
a data switch;
a fabric interface controller operably coupled with the data switch; and
a virtual fabric interface controller operably coupled with the fabric interface controller, the fabric interface controller being configured to:
receive a first data packet from the data switch;
segment the first data packet into a first plurality of packet segments;
communicate a first portion the first plurality of packet segments to a second network device; and
communicate a second portion of the first plurality of packet segments to the virtual fabric interface controller; and
the virtual fabric interface controller being configured to:
communicate the second portion of the first plurality of packet segments to the second network device.

21. The network device of claim 20, wherein:
the virtual fabric interface controller is further configured to:
receive a first portion of a second plurality of data packet segments; and
communicate the first portion of the second plurality of data packet segments to the fabric interface controller, and
the fabric interface controller is configured to:
receive a second portion of the second plurality of data packet segments;
assemble the first portion of the second plurality of data packet segments and the second portion of the second plurality of data packet segments to generate a second data packet; and
communicate the second data packet to the data switch.

* * * * *